United States Patent
Shinomoto et al.

(10) Patent No.: US 9,077,274 B2
(45) Date of Patent: Jul. 7, 2015

(54) HEAT PUMP DEVICE, HEAT PUMP SYSTEM, AND METHOD FOR CONTROLLING THREE-PHASE INVERTER

(75) Inventors: Yosuke Shinomoto, Tokyo (JP); Kazunori Hatakeyama, Tokyo (JP); Shinsaku Kusube, Tokyo (JP); Shinya Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 35 days.

(21) Appl. No.: 13/982,294

(22) PCT Filed: Feb. 7, 2011

(86) PCT No.: PCT/JP2011/052480
§ 371 (c)(1),
(2), (4) Date: Jul. 29, 2013

(87) PCT Pub. No.: WO2012/107987
PCT Pub. Date: Aug. 16, 2012

(65) Prior Publication Data
US 2013/0305760 A1    Nov. 21, 2013

(51) Int. Cl.
*H02P 6/00* (2006.01)
*H02P 23/00* (2006.01)
(Continued)

(52) U.S. Cl.
CPC .......... *H02P 23/0036* (2013.01); *F25B 49/025* (2013.01); *F25B 2600/021* (2013.01);
(Continued)

(58) Field of Classification Search
CPC ............ H02P 2207/05; H02P 21/0039; H02P 21/0053; H02P 21/04; H02P 21/06
USPC .......... 318/473, 503, 400.02, 400.36, 400.32; 62/324.1, 56, 238.7, 126, 228.1
See application file for complete search history.

(56) References Cited

U.S. PATENT DOCUMENTS 6,316,985 B1 * 11/2001 Kobayashi et al. ........... 327/536
2003/0128009 A1    7/2003 Sakurai et al.
(Continued)

FOREIGN PATENT DOCUMENTS

JP    60-68341 U    5/1985
JP    61-091445 A    5/1986
(Continued)

OTHER PUBLICATIONS

International Search Report of the International Searching Authority mailed Apr. 5, 2011 for the corresponding international application No. PCT/JP2011/052480 (with English translation).
(Continued)

*Primary Examiner* — Paul Ip
(74) *Attorney, Agent, or Firm* — Posz Law Group, PLC

(57) ABSTRACT

An object of the present invention is to efficiently heat a refrigerant retained in a compressor. An inverter control unit generates six drive signals corresponding to the respective switching elements of the inverter, and outputs the generated drive signals to the corresponding switching elements of the inverter to cause the inverter to generate a high-frequency AC voltage. Particularly, the inverter control unit generates a drive signal having a switching pattern A for turning on all the three switching elements on a positive voltage side or a negative voltage side of the inverter, and subsequent thereto, generates a drive signal having a switching pattern B for turning on two switching elements of the three switching elements and turning off one switching element thereof.

14 Claims, 12 Drawing Sheets

(51) Int. Cl.

| | | |
|---|---|---|
| *F25B 49/02* | (2006.01) | |
| *H02P 27/08* | (2006.01) | |
| *F04B 39/06* | (2006.01) | |
| *H02P 29/00* | (2006.01) | |
| *H02M 7/5387* | (2007.01) | |

(52) U.S. Cl.
 CPC ............. *H02P27/085* (2013.01); *Y02B 30/741* (2013.01); *F04B 39/06* (2013.01); *H02P 29/005* (2013.01); *H02M 7/53875* (2013.01); *H02M 2007/53876* (2013.01)

(56) References Cited

U.S. PATENT DOCUMENTS

| 2008/0001571 | A1* | 1/2008 | Tomigashi | 318/721 |
|---|---|---|---|---|
| 2009/0164047 | A1* | 6/2009 | Hwang et al. | 700/275 |
| 2010/0066284 | A1* | 3/2010 | Iwaji et al. | 318/400.02 |
| 2011/0122661 | A1* | 5/2011 | Sakakibara | 363/37 |
| 2011/0141777 | A1* | 6/2011 | Sakakibara | 363/69 |
| 2011/0241587 | A1* | 10/2011 | Naruse et al. | 318/400.27 |
| 2012/0086374 | A1 | 4/2012 | Arisawa et al. | |

FOREIGN PATENT DOCUMENTS

| JP | 08-226714 A | 9/1996 |
|---|---|---|
| JP | 11-159467 A | 6/1999 |
| JP | 2003-199389 A | 7/2003 |
| JP | 2008-057425 A | 3/2008 |
| JP | 2010-074898 A | 4/2010 |
| WO | 2010/119526 A1 | 10/2010 |

OTHER PUBLICATIONS

Office Action issued Mar. 27, 2015 in the corresponding Australian application No. 2011358803.

* cited by examiner

FIG.3

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

HEAT PUMP DEVICE, HEAT PUMP SYSTEM, AND METHOD FOR CONTROLLING THREE-PHASE INVERTER

CROSS REFERENCE TO RELATED APPLICATION

This application is a U.S. national stage application of International Patent Application No. PCT/JP2011/052480 filed on Feb. 7, 2011, the disclosure of which is incorporated herein by reference.

TECHNICAL FIELD

The present invention relates to a heating technique of a compressor used in a heat pump device.

BACKGROUND

In Patent Literature 1, there is a description of supplying a high-frequency low voltage to a compressor during shutdown at the time of heating. In Patent Literature 2, there is a description of supplying a single-phase AC voltage having a frequency higher than that at the time of a normal operation to a compressor, when the ambient temperature of an air conditioning unit becomes low.

In Patent Literatures 1 and 2, by applying a high-frequency AC voltage to a compressor according to decrease in the outside air temperature, the compressor is heated or kept warm, thereby facilitating a lubrication action inside the compressor.

PATENT LITERATURES

Patent Literature 1: Japanese Utility Model Laid-open No. 60-68341
Patent Literature 2: Japanese Patent Application Laid-open No. 61-91445

In Patent Literature 1, there is no detailed description about a high-frequency low voltage. Therefore, it has not been known what kind of high-frequency low voltage is to be supplied to the compressor.

In Patent Literature 2, there is a description of applying a single-phase AC power having a frequency as high as 25 kHz. Because it is a high-frequency single-phase AC power, as shown in FIG. 3 of Patent Literature 2, a full-off section in which all switching elements are turned off becomes generated for a relatively long term. In the full-off section, a high-frequency current is regenerated to a DC power supply without being refluxed to a motor via a reflux diode. For this reason, in the full-off section, the current is attenuated quickly, and thus the high-frequency current does not efficiently flow to the motor, thereby deteriorating the heating efficiency of the compressor.

SUMMARY

An object of the present invention is to efficiently heat a refrigerant retained in a compressor.

Solution to Problem

The present invention provides a heat pump device comprising:
a compressor having a compression mechanism for compressing a refrigerant;
a motor that actuates the compression mechanism of the compressor;
a three-phase inverter that applies a predetermined voltage to the motor and is configured to parallel-connect three serial connection parts each having two switching elements; and
an inverter control unit that generates six drive signals corresponding to the respective switching elements of the three-phase inverter, and outputs the generated drive signals to the corresponding switching elements of the three-phase inverter to cause the three-phase inverter to generate a high-frequency AC voltage, wherein the inverter control unit generates a drive signal having a switching pattern A for turning on all the three switching elements on a positive voltage side or a negative voltage side of the three-phase inverter, and subsequent to the drive signal having the switching pattern A, does not generate a drive signal having a switching pattern for turning off two or more switching elements of the three switching elements, but generates a drive signal having a switching pattern B for turning on two switching elements of the three switching elements and turning off one switching element thereof.

In the heat pump device according to the present invention, because a high-frequency voltage is applied to a three-phase inverter, a refrigerant retained in a compressor can be efficiently heated by iron loss of a motor and copper loss generated by a current flowing in a winding.

Particularly, in the heat pump device according to the present invention, two or more switching elements of three switching elements on a positive voltage side are not simultaneously turned off from a state where all the three switching elements on the positive voltage side are on, and only one switching element is turned off. Therefore, a current can efficiently flow to the motor, and as a result, the refrigerant retained in the compressor can be heated efficiently.

BRIEF DESCRIPTION OF DRAWINGS

FIG. 3 is a chart showing eight switching patterns.

DESCRIPTION OF EMBODIMENTS

First Embodiment

Figure 1:
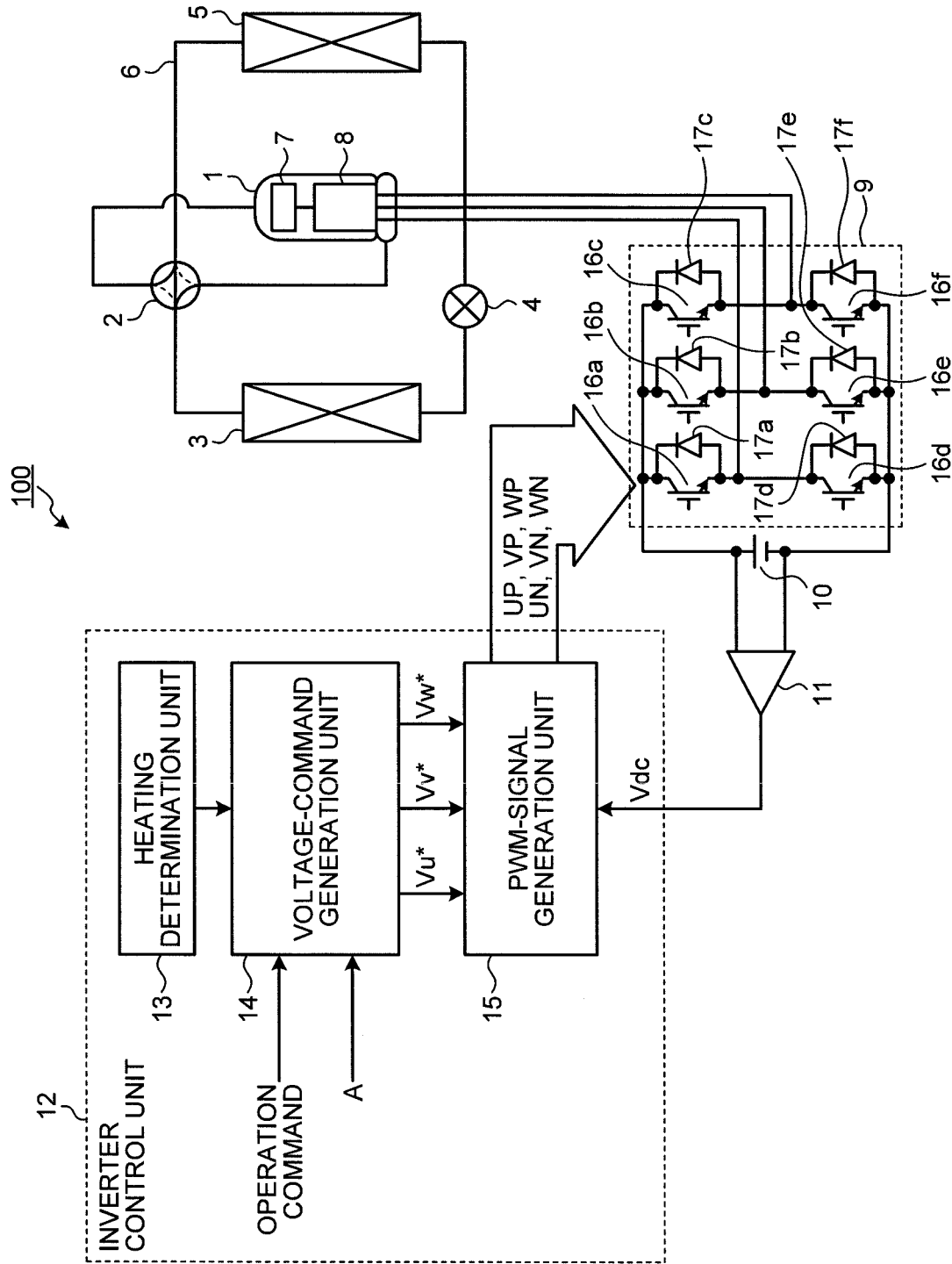
FIG. 1 is a diagram showing a configuration of a heat pump device 100 according to a first embodiment.

FIG. 1 is a diagram showing a configuration of a heat pump device 100 according to a first embodiment.

The heat pump device 100 includes a refrigeration cycle in which a compressor 1, a four-way valve 2, a heat exchanger 3, an expansion mechanism 4, and a heat exchanger 5 are sequentially connected via refrigerant piping 6. A compression mechanism 7 that compresses a refrigerant and a motor 8 that actuates the compression mechanism 7 are provided in the compressor 1.

An inverter 9 that applies a voltage to the motor 8 to drive it is electrically connected to the motor 8. A DC power supply 10 for the inverter 9 is provided with a bus-voltage detection unit 11 that detects a bus voltage that is a voltage of the DC power supply 10. Control input terminals of the inverter 9 are connected to the inverter control unit 12. The inverter control unit 12 includes a heating determination unit 13, a voltage-command generation unit 14 (voltage-command selection unit), and a PWM-signal generation unit 15 (drive-signal generation unit).

The inverter 9 is a three-phase inverter in which three series connection circuits of two switching elements (16a and 16d, 16b and 16e, and 16c and 16f) are connected in parallel for three phases. The inverter 9 drives the corresponding switching elements in accordance with PWM signals UP, VP, WP, UN, VN and WN (drive signals), respectively, transmitted from the inverter control unit 12 (16a driven by UP, 16b driven by VP, 16c driven by WP, 16d driven by UN, 16e driven by VN, and 16f driven by WN).

The inverter control unit 12 obtains command values Vu*, Vv* and Vw* of the voltages to be applied to the motor 8 by the voltage-command generation unit 14, when the heating determination unit 13 determines that a liquid refrigerant is retained in the compressor 1 (the refrigerant is pooled). The PWM-signal generation unit 15 generates the PWM signal based on the voltage command values Vu*, Vv* and Vw* obtained by the voltage-command generation unit 14.

Now, description is made for a basic method for the PWM-signal generation unit 15 to generate the PWM signal.

Figure 2:
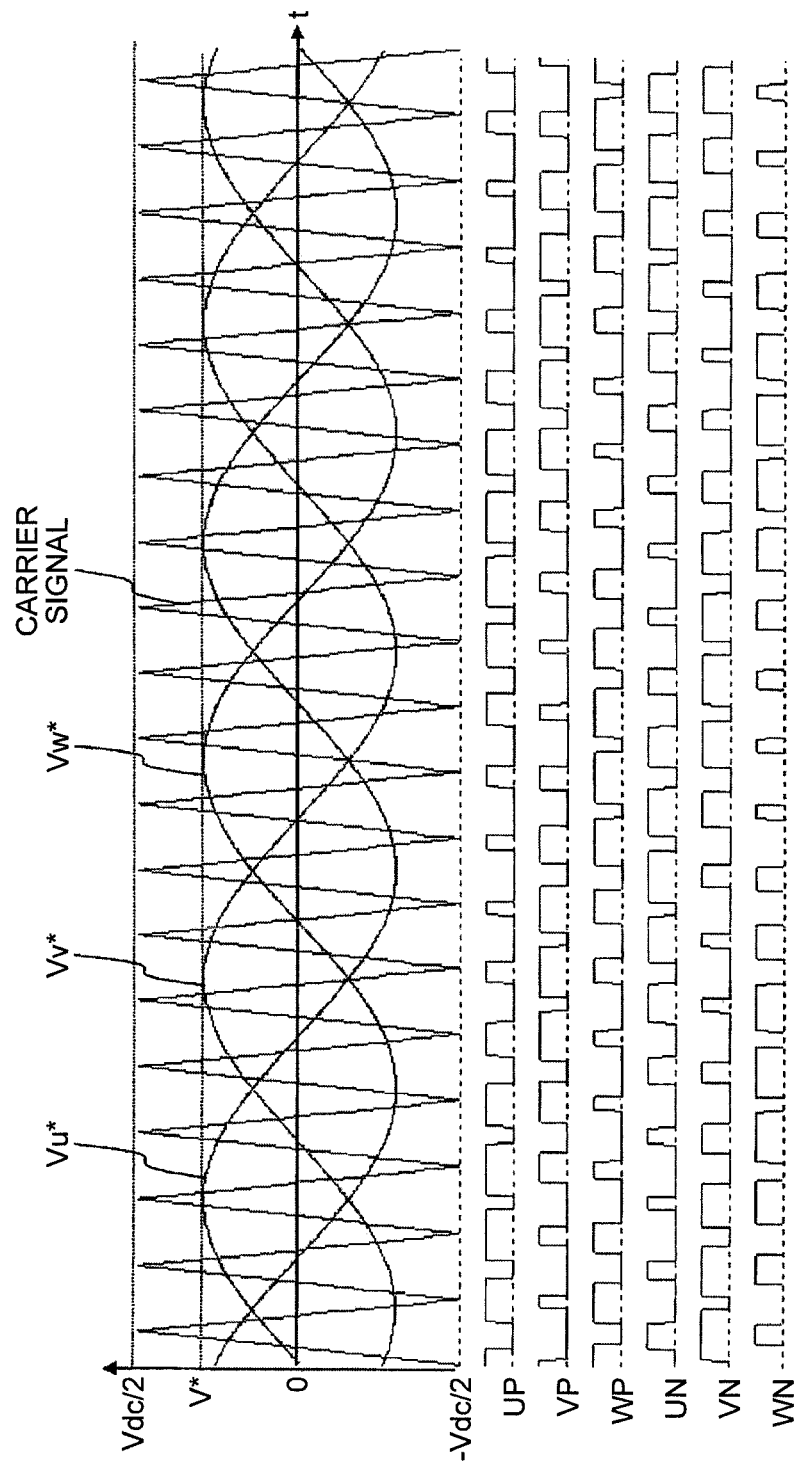
FIG. 2 is a chart showing input/output waveforms of a PWM-signal generation unit 15.

FIG. 2 is a chart showing input/output waveforms of the PWM-signal generation unit 15.

For example, the voltage command values Vu*, Vv* and Vw* are defined as sine waves having phases different by $2\pi/3$ as shown in Equations (1) to (3). Herein, $\theta$ denotes a phase of the voltage command value (an example of an operation command), and A denotes an amplitude of the voltage command value.

$$Vu^* = A \cos \theta \quad (1)$$

$$Vv^* = A \cos(\theta - (2/3)\pi) \quad (2)$$

$$Vw^* = A \cos(\theta + (2/3)\pi) \quad (3)$$

The voltage-command generation unit 14 calculates the voltage command values Vu*, Vv* and Vw* in Equations (1) to (3) based on the voltage phase command $\theta$ and the amplitude A, and outputs the calculated voltage command values Vu*, Vv* and Vw* to the PWM-signal generation unit 15. The PWM-signal generation unit 15 compares the voltage command values Vu*, Vv* and Vw* with a carrier signal (reference signal) having an amplitude Vdc/2 at a predetermined frequency, and generates PWM signals UP, VP, WP, UN, VN and WN based on a magnitude relation to each other. Vdc is a bus voltage detected by the bus-voltage detection unit 11.

For example, when the voltage command value Vu* is larger than the carrier signal, UP is for outputting a voltage for turning on the switching element 16a, and UN is for outputting a voltage for turning off the switching element 16d. On the other hand, when the voltage command value Vu* is smaller than the carrier signal, inversely, UP is for outputting a voltage for turning off the switching element 16a, and UN is for outputting a voltage for turning on the switching element 16d. The same applies to the other signals, and VP and VN are determined based on the comparison between the voltage command value Vv* and the carrier signal, and WP and WN are determined based on the comparison between the voltage command value Vw* and the carrier signal.

In a case of a general inverter, because a complementary PWM system is adopted therefor, UP and UN, VP and VN, and WP and WN have an inverse relationship to each other. Therefore, there are eight switching patterns in total, and the inverter outputs a voltage by combining the eight switching patterns.

FIG. 3 is a chart showing eight switching patterns. In FIG. 3, reference symbols V0 to V7 denote voltage vectors generated in the respective switching patterns. The voltage directions of the respective voltage vectors are represented by ±U, ±V and ±W (or 0 when no voltage is generated). Here, "U" means a voltage for generating a current in a U-phase direction, which flows into the motor 8 via a U-phase and flows out from the motor 8 via a V-phase and a W-phase, and "–U" means a voltage for generating a current in a –U phase direction, which flows into the motor 8 via the V-phase and the W-phase and flows out from the motor 8 via the U-phase. The similar interpretation applies to ±V and ±W.

The inverter 9 can be caused to output desired voltages by combining the switching patterns shown in FIG. 3 and outputting a voltage vector. At this time, a high frequency voltage can be outputted by changing the phase $\theta$ at a high speed, and increasing the frequency of a modulation wave (three sine waves in FIG. 2) defining the voltage command values Vu*, Vv* and Vw*.

The voltage vectors V0 and V7 in which a voltage is not generated are referred to as "zero vector", and the other voltage vectors are referred to as "real vectors".

The voltage command values Vu*, Vv* and Vw* may be obtained in two-phase modulation, triple harmonic superimposition modulation, space vector modulation, and the like other than Equations (1) to (3).

An operation of the inverter control unit 12 is explained next.

Figure 4:
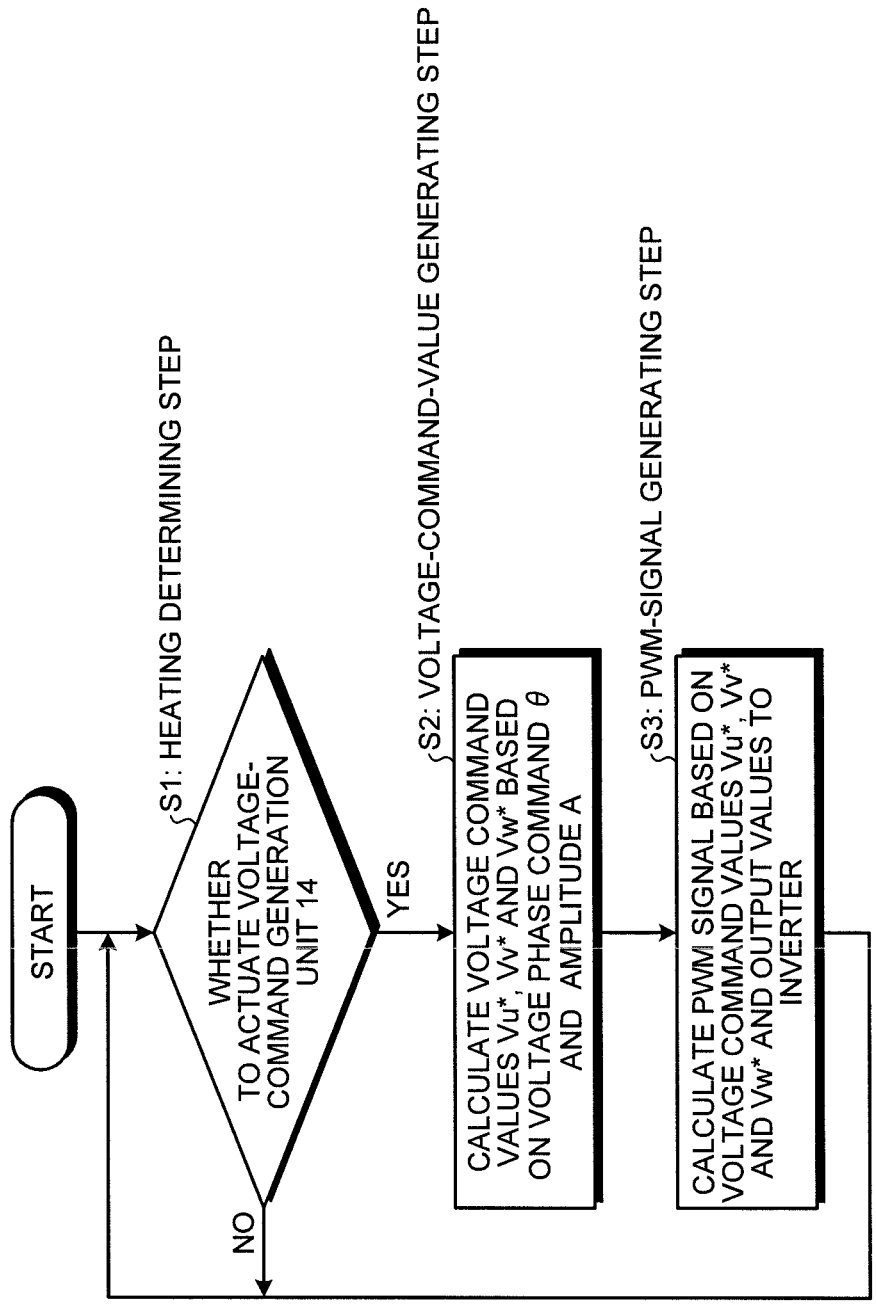
FIG. 4 is a flowchart showing an operation of an inverter control unit 12.

FIG. 4 is a flowchart showing an operation of the inverter control unit 12.

(S1: Heating Determining Step)

The heating determination unit 13 determines whether to actuate the voltage-command generation unit 14 based on whether the refrigerant is retained in the compressor 1, during shutdown of the compressor 1.

When the heating determination unit 13 determines that the voltage-command generation unit 14 should be actuated because the refrigerant is retained in the compressor 1 (YES at S1), the process proceeds to S2, thereby to go into a heating operation mode that generates PWM signals for preheating. On the other hand, when the heating determination unit 13 determines that the voltage-command generation unit 14 should not be actuated because the refrigerant is not retained in the compressor 1 (NO at S1), the heating determination unit 13 determines whether to actuate the voltage-command generation unit 14 again after a predetermined period of time has passed.

(S2: Voltage-Command-Value Generating Step)

The voltage-command generation unit 14 calculates the voltage command values Vu*, Vv* and Vw* in Equations (1) to (3) based on the voltage phase command θ and the amplitude A, and outputs the calculated voltage command values Vu*, Vv* and Vw* to the PWM-signal generation unit 15.

(S3: PWM-Signal Generating Step)

The PWM-signal generation unit 15 compares the voltage command values Vu*, Vv* and Vw* outputted by the voltage-command generation unit 14 with the carrier signal to obtain the PWM signals UP, VP, WP, UN, VN and WN, and outputs these PWM signals to the inverter 9. Accordingly, the switching elements 16a to 16f of the inverter 9 are driven to apply a high-frequency voltage to the motor 8.

By applying the high-frequency voltage to the motor 8, the motor 8 is efficiently heated by iron loss of the motor 8 and copper loss generated by the current flowing in the winding. By the motor 8 being heated, the liquid refrigerant retained in the compressor 1 is heated and evaporated, and leaked to outside of the compressor 1.

After a predetermined period of time has passed, the heating determination unit 13 returns to S1 again, and determines whether further heating is required.

When the high-frequency voltage having a frequency equal to or higher than an operation frequency used at the time of a compression operation (compression operation mode) is applied to the motor 8, a rotor in the motor 8 becomes unable to follow the frequency, and any rotations or vibrations are not generated. Generally, the operation frequency at the time of the compression operation is 1 kHz at most. Therefore, a high-frequency voltage having a frequency equal to or larger than 1 kHz only has to be applied to the motor 8. Furthermore, when a high-frequency voltage having a frequency equal to or higher than 14 kHz is applied to the motor 8, vibration sound of an iron core of the motor 8 approaches nearly an upper limit of an audible frequency, so that there is an effect for reducing noise.

In a case of a general inverter, a carrier frequency, that is a frequency of a carrier signal, has an upper limit that is determined by a switching speed of switching elements of the inverter. Therefore, it is difficult to output a high-frequency voltage having a frequency equal to or higher than the carrier frequency. In a case of a general IGBT (Insulated Gate Bipolar Transistor), the upper limit of the switching speed is about 20 kHz.

When the frequency of the modulation wave that defines the voltage command values Vu*, Vv* and Vw* becomes about 1/10 of the carrier frequency, an adverse effect may occur such that the waveform output accuracy of the high-frequency voltage deteriorates and DC components are superimposed on the high frequency voltage. In view of this, when the carrier frequency is set to 20 kHz, if the frequency of the modulation wave is set equal to or lower than 2 kHz that is 1/10 of the carrier frequency, then the frequency of the high-frequency voltage becomes in an audible frequency range, resulting in concern that noise is increased.

Therefore, in the heating operation mode, the voltage-command generation unit 14 switches the voltage command values Vu*, Vv* and Vw* between Hi (+A in this example) and Lo (−A in this example) alternately in synchronization with the carrier signal, without calculating the voltage command values Vu*, Vv* and Vw* based on the method explained with reference to FIG. 2.

Figure 5:
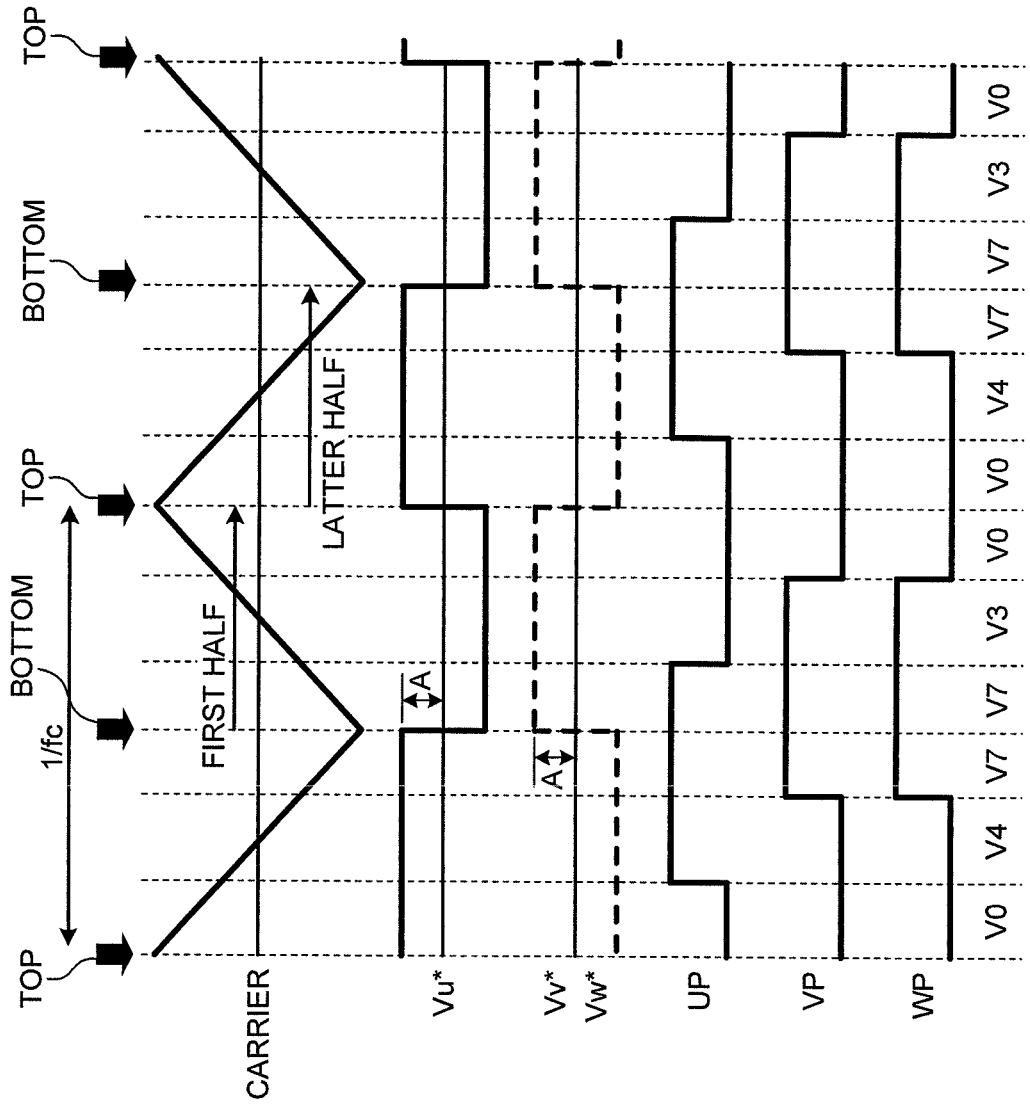
FIG. 5 is a timing chart when voltage command values Vu*, Vv* and Vw* are switched one after the other at timings of a top (peak) and a bottom (valley) of a carrier signal.

FIG. 5 is a timing chart when the voltage command values Vu*, Vv* and Vw* are alternately switched at timings of a top (peak) and a bottom (valley) of the carrier signal. In FIG. 5, in a section from the bottom to the top of the carrier signal (hereinafter, called "first half"), the voltage command value Vu* is set to Lo and the voltage command values Vv* and Vw* are set to Hi. In a section from the top to the bottom of the carrier signal (hereinafter, called "latter half"), the voltage command value Vu* is set to Hi and the voltage command values Vv* and Vw* are set to Lo. Because the UP, VP and WP are opposite in ON/OFF state to UN, VN and WN, respectively and if the state of one value is known, then the other value can be known, only UP, VP and WP are described here.

When the voltage command values Vu*, Vv* and Vw* shown in FIG. 5 are compared with the carrier signal, the PWM signals change as shown in FIG. 5. Then, the voltage vector changes in order of V0 (UP=VP=WP=0), V4(UP=1, VP=WP=0), V7 (UP=VP=WP=1), V3 (UP=0, VP=WP=1), V0 (UP=VP=WP=0), and so on.

Figure 6:
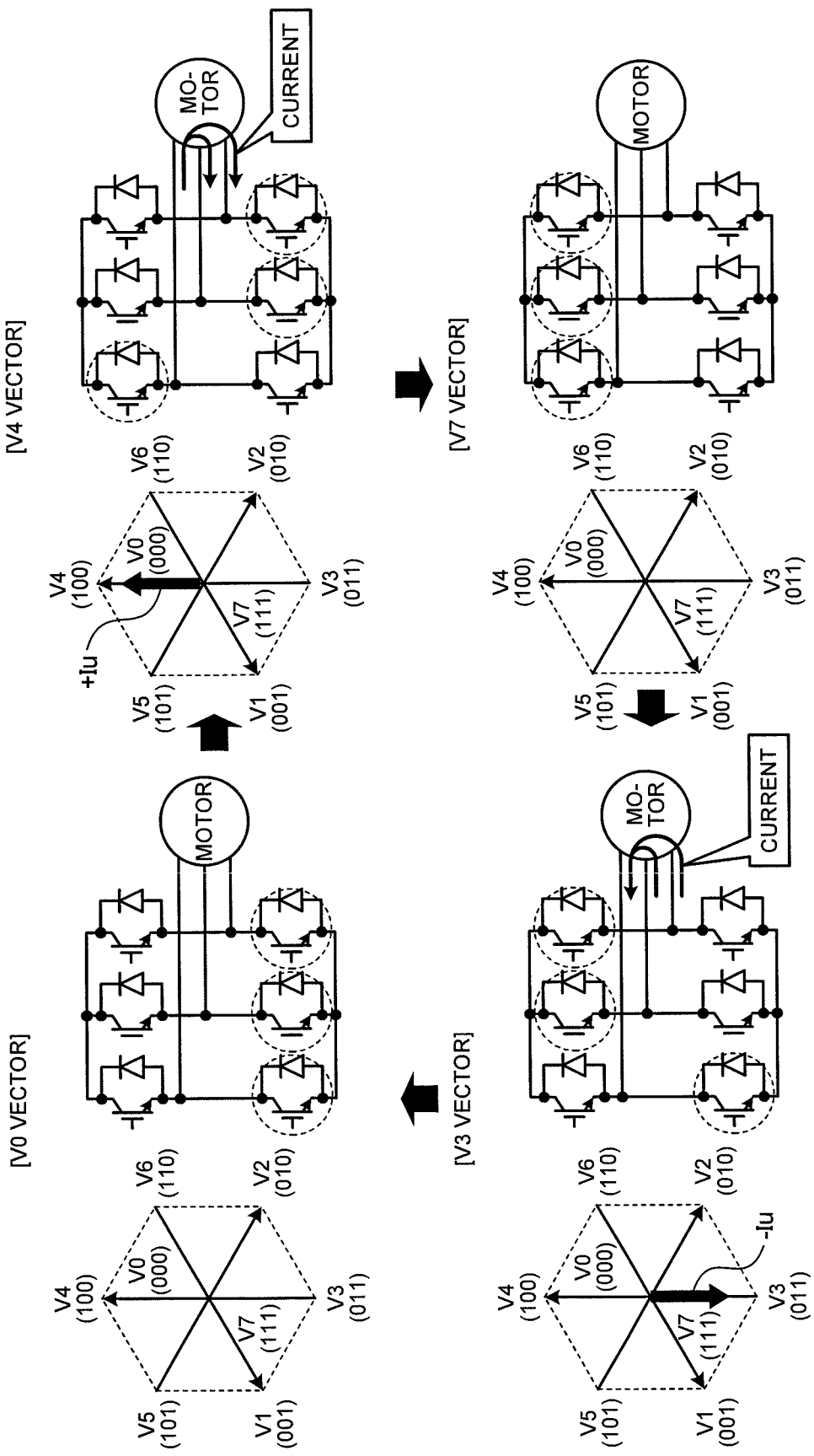
FIG. 6 is an explanatory diagram of change of the voltage vector shown in FIG. 5.

FIG. 6 is an explanatory diagram of change in the voltage vector shown in FIG. 5. In FIG. 6, it is represented that a switching element 16 surrounded by a broken line is in ON state, and a switching element 16 not surrounded by a broken line is in OFF state.

As shown in FIG. 6, at the time of applying the V0 vector and the V7 vector, lines of the motor 8 are short-circuited, and any voltage is not outputted. In this case, the energy stored in the inductance of the motor 8 becomes a current, and the current flows in the short circuit. That is, a reflux current that circulates in the motor 8 and the inverter 9 flows by virtue of diodes 17 connected in inverse-parallel to the switching elements 16a to 16f of the inverter 9. At the time of applying the V4 vector, a current (current of +Iu) flows in the direction of the U-phase, in which the current flows into the motor 8 via the U-phase and flows out from the motor 8 via the V-phase and the W-phase, and at the time of applying the V3 vector, a current (current of −Iu) flows to the winding of the motor 8 in the direction of the −U phase, in which the current flows into the motor 8 via the V-phase and the W-phase and flows out from the motor 8 via the U-phase. That is, the current flows to the winding of the motor 8 at the time of applying the V4 vector in the opposite direction to that at the time of applying the V3 vector and vice versa. Because the voltage vector changes in order of V0, V4, V7, V3, V0, and so on, the current of +Iu and the current of −Iu flow to the winding of the motor 8 alternately. Particularly, as shown in FIG. 5, because the V4 vector and the V3 vector appear during one carrier cycle (1/fc), an AC voltage synchronized with a carrier frequency fc can be applied to the winding of the motor 8.

Because the V4 vector (the current of +Iu) and the V3 vector (the current of −Iu) are alternately outputted, forward and reverse torques are switched instantaneously. Therefore, because the torques are compensated, the voltage application is possible while suppressing vibrations of the rotor.

Figure 7:
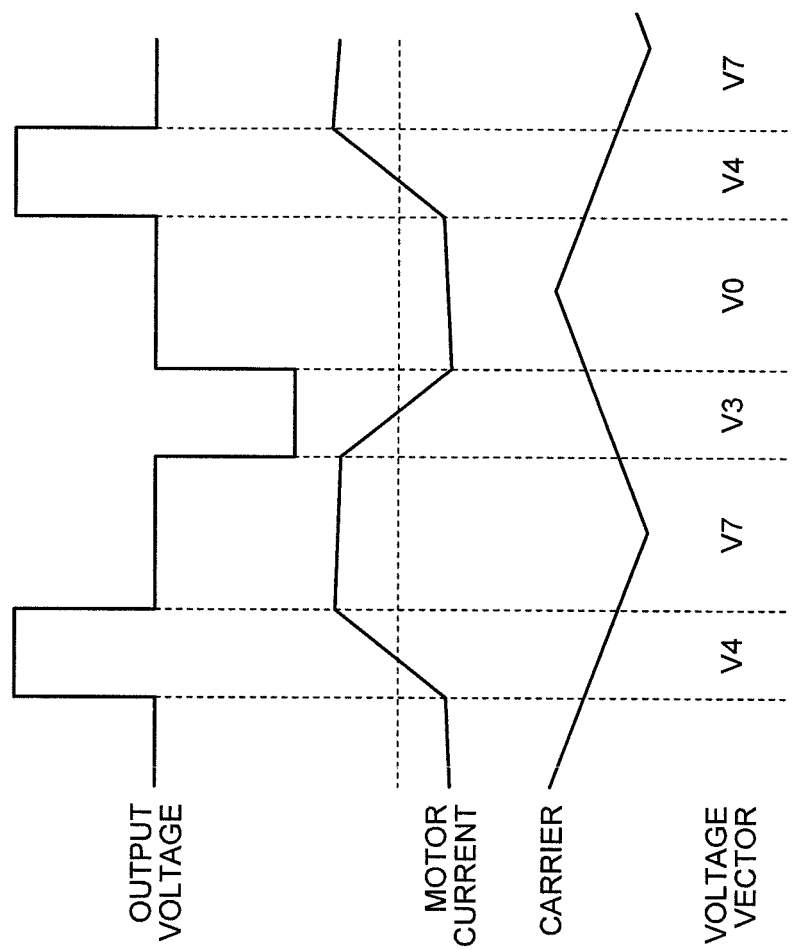
FIG. 7 is an explanatory chart of an output voltage and a current flowing to a motor 8 when an inverter 9 is operated by a PWM signal shown in FIG. 5.

FIG. 7 is an explanatory chart of an output voltage and a current flowing to the motor 8 when the inverter 9 is operated by the PWM signal shown in FIG. 5.

As shown in FIG. 7, the current flowing to the motor 8 increases at the time of the voltage vector V4, and decreases at the time of the voltage vector V3. At the times of the voltage vectors V0 and V7 that are the zero vectors, as described above, the reflux current that circulates in the motor 8 and the inverter 9 flows by virtue of the diodes 17 connected in inverse-parallel to the switching elements 16a to 16f of the inverter 9.

When all the switching elements are turned off, the reflux current described above can not flow and the current flows only to the diodes connected in inverse-parallel thereto, and the mode changes to a regeneration mode in which the current flows into the DC power supply 10. Because the DC power supply 10 is generally formed by a capacitor that accumulates electric charges, the current flowing to the motor 8 steeply attenuates in the case of the regeneration mode. Therefore, it is required to increase the length of time for which the switching elements 16a to 16f are set ON. When the IGBT or the like having an ON voltage (threshold voltage) higher than that of the diode is used for the switching elements 16a to 16f, if the length of time for which the switching elements 16a to 16f are set ON is increased, conduction loss or the like generated due to the flow of the current increases.

In the heat pump device 100 according to the first embodiment, the refrigerant retained in the compressor can be efficiently heated by using a state (referred as "zero vector") where the current is refluxed in the motor 8, without turning off all the switching elements.

Figure 8:
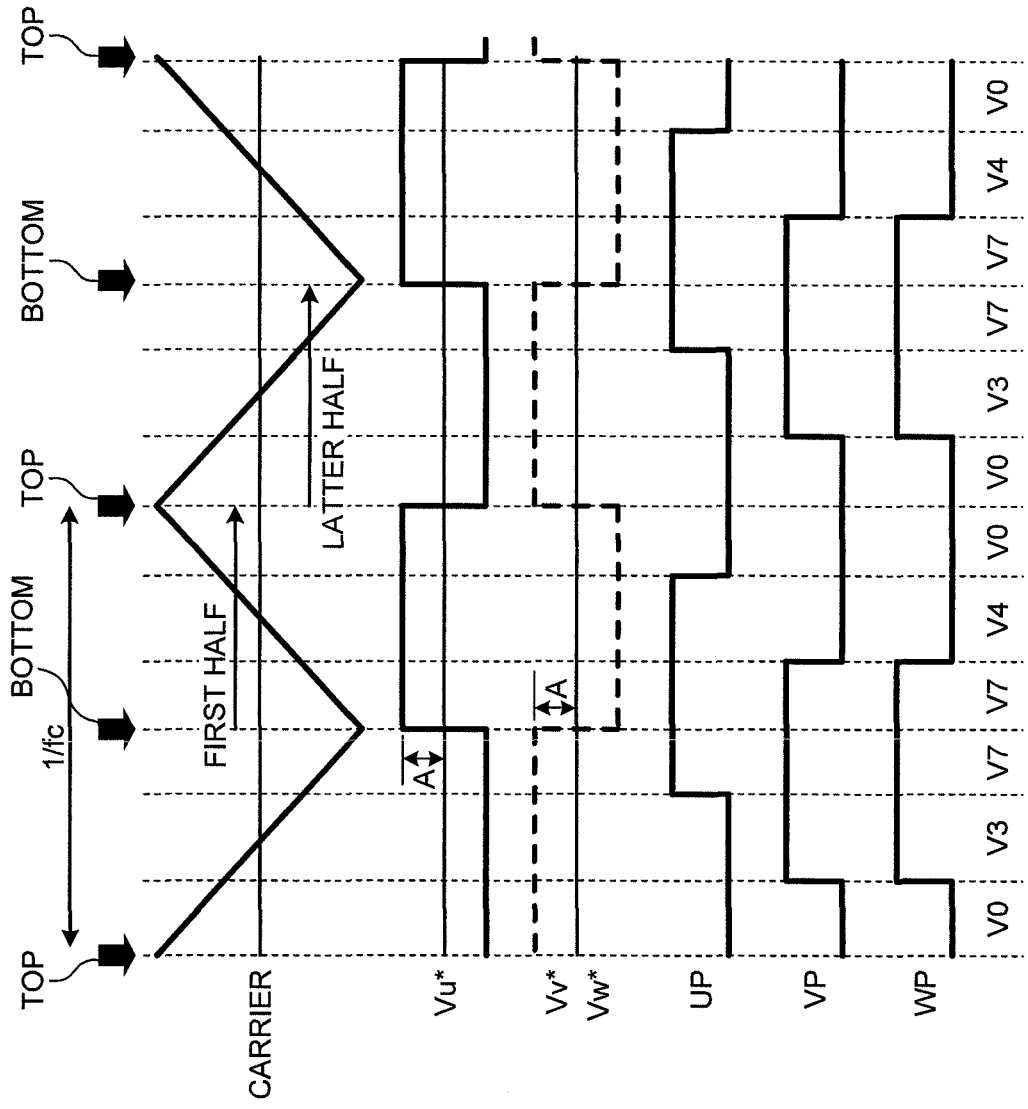
FIG. 8 is a timing chart different from FIG. 5, when the voltage command values Vu*, Vv* and Vw* are switched one after the other at timings of a top and a bottom of a carrier signal.

FIG. 8 is a timing chart different from FIG. 5, when the voltage command values Vu*, Vv* and Vw* are alternately switched at timings of a top and a bottom of a carrier signal. There is a difference between FIG. 5 and FIG. 8 in that the relation between the phase of the carrier signal and the phase of the voltage commands (Vu*, Vv* and Vw*) is reversed. That is, in FIG. 8, the voltage command value Vu* is set to Hi and the voltage command values Vv* and Vw* are set to Lo in the first half of the carrier signal, and the voltage command value Vu* is set to Lo and the voltage command values Vv* and Vw* are set to Hi in the latter half of the carrier signal.

When the voltage command values Vu*, Vv* and Vw* shown in FIG. 8 are compared with the carrier signal, the PWM signal changes as shown in FIG. 8. Then, the voltage vector changes in order of V0 (UP=VP=WP=0), V3 (UP=0, VP=WP=1), V7 (UP=VP=WP=1), V4 (UP=1, VP=WP=0), V0 (UP=VP=WP=0), and so on.

In other words, in FIG. 5, the voltage vector shown in FIG. 6 changes from V0 in a clockwise direction, whereas in FIG. 8, the voltage vector shown in FIG. 6 changes from V0 in a counterclockwise direction.

Figure 9:
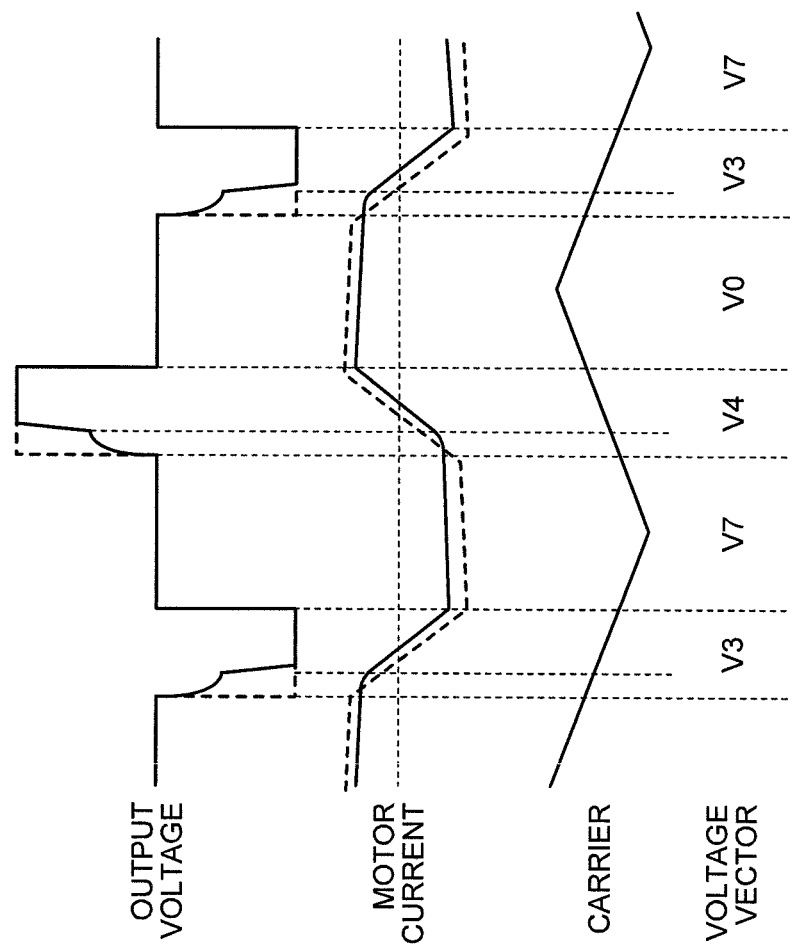
FIG. 9 is an explanatory chart of an output voltage and a current flowing to the motor 8 when the inverter 9 is operated by a PWM signal shown in FIG. 8.

FIG. 9 is an explanatory chart of an output voltage and a current flowing to the motor 8 when the inverter 9 is operated by the PWM signals shown in FIG. 8. In FIG. 9, the broken line indicates the output voltage and the current flowing to the motor 8 shown in FIG. 7 (that is, when the inverter 9 is actuated by the PWM signals shown in FIG. 5).

As shown in FIG. 9, the current reverses in the voltage vectors V3 and V4, that are real vectors, so that an AC high-frequency current is generated. However, in the case of the phase relation shown in FIG. 8, the rise of an output voltage is slow as compared with the phase relation shown in FIG. 5, and there occurs such a phenomenon that the output voltage becomes lower than the voltage command values Vu*, Vv* and Vw*. As a result, polarity change of the current flowing to the motor 8 is delayed, and the amount of current flowing to the motor 8 decreases as compared with the case where the inverter 9 is actuated by the PWM signals shown in FIG. 5 (see the broken line).

Accordingly, when the inverter 9 is actuated by the PWM signals shown in FIG. 8, electric power for preheating the motor 8 decreases as compared with the case where the inverter 9 is actuated by the PWM signals shown in FIG. 5, and a preheating amount decreases despite the same voltage command values Vu*, Vv* and Vw*.

The reason why the output voltage rise is slow when the inverter 9 is actuated by the PWM signals shown in FIG. 8 is explained.

When the inverter 9 is actuated by the PWM signals shown in FIG. 8, the voltage vector changes in order of V0, V3, V7, V4, V0 and so on. In a locus of the voltage vector, in a case where the voltage vector changes from V0 to V3 and a case where the voltage vector changes from V7 to V4, two-phase switching is caused in which switching elements for two phases on the positive voltage side or the negative voltage side change simultaneously (see FIG. 6). That is, in a case where the voltage vector changes from the zero vector to the real vector, two-phase switching occurs.

Even when the inverter 9 is actuated by the PWM signals shown in FIG. 5, the two-phase switching occurs. However, when the inverter 9 is actuated by the PWM signals shown in FIG. 5, the voltage vector changes in order of V0, V4, V7, V3, V0 and so on. Therefore, two-phase switching occurs in the case where the voltage vector changes from V4 to V7 and in the case where the voltage vector changes from V3 to V0 (see FIG. 6). That is, in a case where the voltage vector changes from the real vector to the zero vector, two-phase switching occurs.

When two-phase switching occurs, two arms each constructed of the switching elements 16 change simultaneously. For example, when the voltage vector changes from V0 to V3, VP=WP=0 changes to VP=WP=1. That is, the switching elements 16e and 16f change from ON to OFF, and the switching elements 16b and 16c change from OFF to ON.

At the time of outputting the zero vector, the current change is only due to attenuation caused by consumption in impedance of the motor 8, so that a current-time change rate di/dt indicating the magnitude of the current change per time is low. On the other hand, at the time of outputting the real vector, the polarity of the current is changed, and the current-time change rate di/dt is high.

When the two-phase switching occurs here, the current-time change rate di/dt may decrease.

When the voltage vector changes from the real vector to the zero vector, change occurs from the state where the current-time change rate di/dt is high to the state where the current-time change rate di/dt is low. In this case, even if two-phase switching occurs and the current-time change rate di/dt decreases, it is originally a changing condition toward the state where the current-time change rate di/dt is low, and thus the influence thereof is small. However, the case where the voltage vector changes from the zero vector to the real vector is a case where the state where the current-time change rate di/dt is low to the state where the current-time change rate di/dt is high. In this case, when two-phase switching occurs and the current-time change rate di/dt decreases, the current-time change rate di/dt decreases, although it is attempted to cause change to the state where the current-time change rate di/dt is high, and thus the influence thereof is large. That is, although it is attempted to cause change to the state where the current is largely changed, the current can not be changed largely. And due to this influence, the polarity change of the current flowing to the motor 8 is delayed.

For this reason, in the case of change from the zero vector to the real vector, if two-phase switching occurs, the polarity change of the current flowing to the motor 8 is delayed.

Because an inductance component of the motor 8 increases and winding impedance increases due to application of the high-frequency voltage, the current flowing in the winding decreases and the current flowing to the inverter 9 also decreases. When two-phase switching occurs herein, the current branched to flow into the two switching elements becomes OFF simultaneously, and the current flowing to the motor 8 is commutated to the diodes 17 connected in inverse parallel. However, as described above, because the current flowing in the inverter 9 is not much, a tail current is generated at the time of turning off the switching element 16, and it takes much time until the current reaches zero. Therefore, when two-phase switching occurs, the rise of the output voltage becomes slow, and the polarity change of the current flowing to the motor 8 is delayed.

In the circumstances, when the voltage vector changes from the zero vector to the real vector, the voltage-command generation unit 14 does not generate a voltage command value for which two-phase switching is caused, but only when the voltage vector changes from the real vector to the zero vector, generates a voltage command value for which two-phase switching is caused.

Accordingly, commutation of the current based on switching on/off of the switching elements 16 can be smoothly performed. As a result, delay of the rise of the output voltage can be limited, and an output voltage loyal to the voltage command values can be obtained, thereby enabling to ensure the preheating amount.

Generally, an upper and lower arm short-circuit prevention time referred to as "Td" is set in the inverter 9. During the Td period, all the switching elements are OFF, and the reflux current flows. Therefore, during the Td period, current attenuation is faster than at the time of the zero vector, and distortion of the output voltage explained with reference to FIG. 9 is likely to occur. Accordingly, in the case where an inverter with the Td being set is used, when the voltage vector changes from the zero vector to the real vector, effects caused by generating no voltage command value for which two-phase switching occurs appear prominently.

As described above, in the heat pump device 100 according to the first embodiment, by applying the high-frequency voltage to the motor 8, the refrigerant retained in the compressor can be efficiently heated by the iron loss of the motor and the copper loss generated by the current flowing in the winding. Particularly, because a voltage command value for which two-phase switching is caused when the voltage vector changes from the zero vector to the real vector is inhibited from being generated, the current can be caused to flow efficiently to the motor, and as a result, the refrigerant retained in the compressor can be efficiently heated.

Further, because the high-frequency voltage is applied to the motor 8, any rotation torque and vibration are not generated.

Furthermore, to achieve a high efficiency, a motor having an IPM (Interior Permanent Magnet) structure or a concentrated winding motor having a small coil end and a low winding resistance has been widely used for the recent compressor motor for a heat pump device. The concentrated winding motor has a small winding resistance and a small amount of heat generation due to copper loss, and thus a large amount of current needs to be caused to flow to the winding. If a large amount of current is caused to flow to the winding, then the current flowing to the inverter 9 also increases, thereby increasing inverter loss.

Therefore, if heating by applying the high-frequency voltage described above is performed, then an inductance component by the high frequency increases, thereby increasing winding impedance. Accordingly, although the current flowing to the winding decreases and the copper loss is reduced, iron loss due to the application of the high-frequency voltage occurs corresponding to the amount of copper loss, thereby enabling to perform efficient heating. Furthermore, because the current flowing to the winding decreases, the current flowing to the inverter also decreases, thereby enabling to reduce the loss of the inverter 9 and perform more efficient heating.

If heating by applying the high-frequency voltage described above is performed, when the compressor is based on a motor having the IPM structure, a rotor surface where high-frequency magnetic fluxes interlink with each other also becomes a heat generating portion. Therefore, increase in an area contacting the refrigerant and prompt heating of the compression mechanism can be realized, thereby enabling to perform efficient heating of the refrigerant.

Further, the DC voltage in the heating mode may be lower than the DC voltage in the compression operation mode. Accordingly, switching loss due to a high frequency can be reduced.

Figure 10:
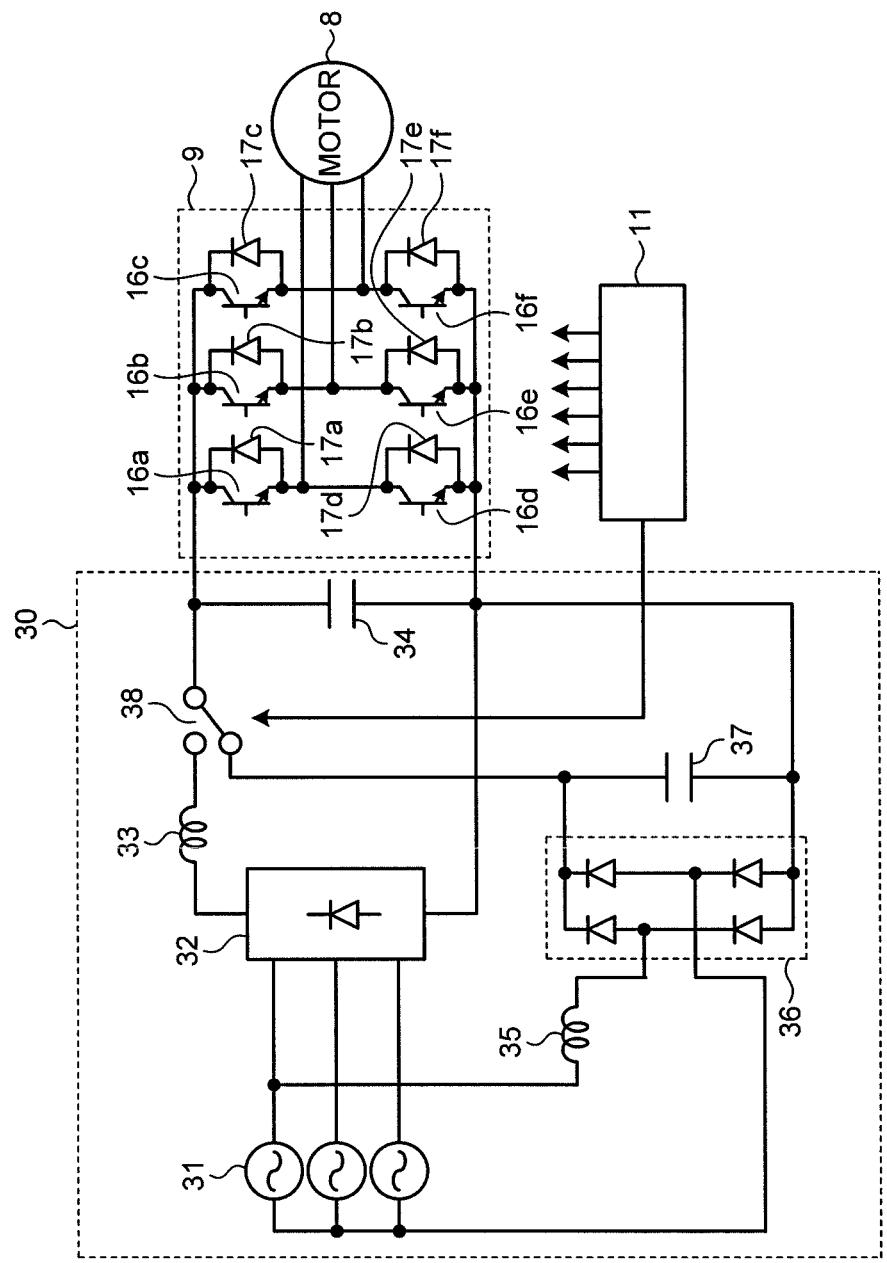
FIG. 10 is a diagram showing a configuration example of a power supply unit 30 of the inverter 9.

FIG. 10 is a diagram showing a configuration example of a power supply unit 30 for the inverter 9. In FIG. 1, the power supply unit 30 is indicated as the DC power supply 10.

The power supply unit 30 includes a three-phase four-wire system AC power supply 31, a three-phase rectifier 32 (first rectifier) that rectifies a three-phase AC output of the AC power supply 31, a DCL 33, a smoothing capacitor 34 that smoothes an output of the three-phase rectifier 32, an ACL 35, a single-phase rectifier 36 (second rectifier) that receives an output of any one phase of the AC power supply 31 and an output of a neutral point of the AC power supply 31 as an input and rectifies the outputs, a smoothing capacitor 37 that smoothes an output of the single-phase rectifier 36, and a switching unit 38 that selects any one of the smoothing capacitor 34 and 37 and outputs a voltage from the selected one to the inverter 9.

Because the AC power supply 31 is of the three-phase four-wire system, a voltage across the smoothing capacitor 34 is different from a voltage across the smoothing capacitor 37. The voltage across the smoothing capacitor 37 is $1/\sqrt{3}$ times of the voltage across the smoothing capacitor 34.

In the compression operation mode, the inverter 9 is driven using the voltage across the smoothing capacitor 34. However, in the heating operation mode, if the inverter 9 is driven using the voltage across the smoothing capacitor 34, it is possible to reduce conduction loss caused by current flow with the amount of current being reduced by the inductance component of the motor 8 due to a high frequency, but switching loss itself increases. The switching loss depends on the input voltage of the inverter 9.

Therefore, in the heating operation mode, the inverter 9 is driven using the voltage across the smoothing capacitor 37, not the voltage across the smoothing capacitor 34. That is, the switching unit 38 is switched so as to output a voltage from the smoothing capacitor 34 to the inverter 9 in the compression operation mode, and output a voltage from the smoothing capacitor 37 to the inverter 9 in the heating operation mode. As described above, the voltage across the smoothing capacitor 37 is $1/\sqrt{3}$ times of the voltage across the smoothing capacitor 34. Therefore, the input voltage of the inverter 9 in the heating operation mode can be more decreased than in the compression operation mode, thereby enabling to reduce switching loss.

Accordingly, switching loss in the inverter 9 in the heating operation mode can be reduced to improve the efficiency of the inverter 9, and power consumption can be reduced. Switching noise can be also reduced by the decreased voltage, and measures against noise can be taken inexpensively.

Needless to mention, the DC voltage in the heating operation mode may be more decreased than the voltage in the compression operation mode in any other methods than the method explained with reference to FIG. 10.

At present, generally, the mainstream trend is to use silicon (Si) as a material of a semiconductor for the switching elements 16a to 16f that constitute the inverter 9 and the diodes 17a to 17f that are connected to the respective switching elements 16a to 16f in parallel. However, instead of this type of semiconductor, a wide band gap semiconductor whose material is silicon carbide (SiC), gallium nitride (GaN) or diamond may be used.

Switching elements and diode elements made from such a wide bandgap semiconductor have a high voltage resistance and a high allowable current density. Therefore, downsizing of the switching elements and diode elements is possible, and by using these downsized switching elements and diode elements, downsizing of a semiconductor module having these elements incorporated therein can be realized.

The switching elements and the diode elements made from such a wide bandgap semiconductor have a high heat resistance. Accordingly, downsizing of a radiator fin of a heat sink and air cooling of a water cooling part can be realized, thereby enabling further downsizing of the semiconductor module.

Furthermore, the switching elements and the diode elements made from such a wide bandgap semiconductor have low power loss. Therefore, the switching elements and the diode elements can be made to have a high efficiency, thereby enabling to make the semiconductor module highly efficient.

While it is desired that both the switching elements $16a$ to $16f$ and the diodes $17a$ to $17f$ are made from a wide bandgap semiconductor, it is also sufficient that either the switching or diode elements are made from a wide bandgap semiconductor.

Furthermore, only the upper switching elements $16a$ to $16c$ or the lower switching elements $16d$ to $16f$ may be made from a wide bandgap semiconductor. In this case, the voltage vector, which becomes the zero vector, is placed with matching the side in which the configuration is made from the wide bandgap semiconductor, thereby enabling to reduce conduction loss caused by the flow of the current.

Alternatively, only the diodes 17 connected in inverse-parallel to the switching elements $16a$ to $16f$ may be made from the wide bandgap semiconductor. This is because the reflux current flows only by the impedance of the motor 8. There is a greater effect particularly when the voltage command value is low so that the length of time during which the reflux current flows becomes large.

Further, when the wide bandgap semiconductor is used, the heat resistance is improved, so that a fan motor for air cooling may be stopped at the time of applying the high-frequency voltage in the heating operation mode. Particularly, because preheat energization for preventing the refrigerant from being retained in the compressor 1 is performed at the time of shutdown of the motor 8, power consumption at the time of shutdown (in a standby mode) can be further reduced in proportion to the driven amount of the fan motor. Accordingly, further reduction of standby power consumption can be realized.

Besides, identical effects can be produced by using a MOS-FET (Metal-Oxide-Semiconductor Field-Effect Transistor) having a super junction structure that is known as a highly efficient switching element.

In a compressor having a scroll mechanism, high-pressure relief of a compression chamber is difficult. Therefore, there is a high possibility of causing breakage of the compression mechanism due to an excessive stress applied to the compression mechanism in a case of liquid compression, as compared to a compressor of other systems. However, in the heat pump device 100 according to the first embodiment, efficient heating of the compressor 1 is possible, and stagnation of a liquid refrigerant in the compressor 1 can be suppressed. Accordingly, liquid compression can be prevented, the heat pump device 100 is beneficial even when a scroll compressor is used as the compressor 1.

Furthermore, in the case of a heating device having a frequency of 10 kHz and an output exceeding 50 W, the heating device may be subjected to the restriction of laws and regulations. For this reason, it may as well be admitted that an amplitude of the voltage command value is adjusted so as not to exceed 50 W in advance, and/or feedback control is executed with detecting the flowing current and the voltage so as to be 50 W or less.

The inverter control unit 12 is configured by a CPU (Central Processing Unit), a DSP (Digital Signal Processor), a microcomputer, an electronic circuit or the like.

One example of a circuit configuration of the heat pump device 100 is explained next.

For example, in FIG. 1 and the like, there is shown the heat pump device 100 in which the compressor 1, the four-way valve 2, the heat exchanger 3, the expansion mechanism 4 and the heat exchanger 5 are sequentially connected by the piping. In this example, the heat pump device 100 having a more specific configuration is explained.

Figure 11:
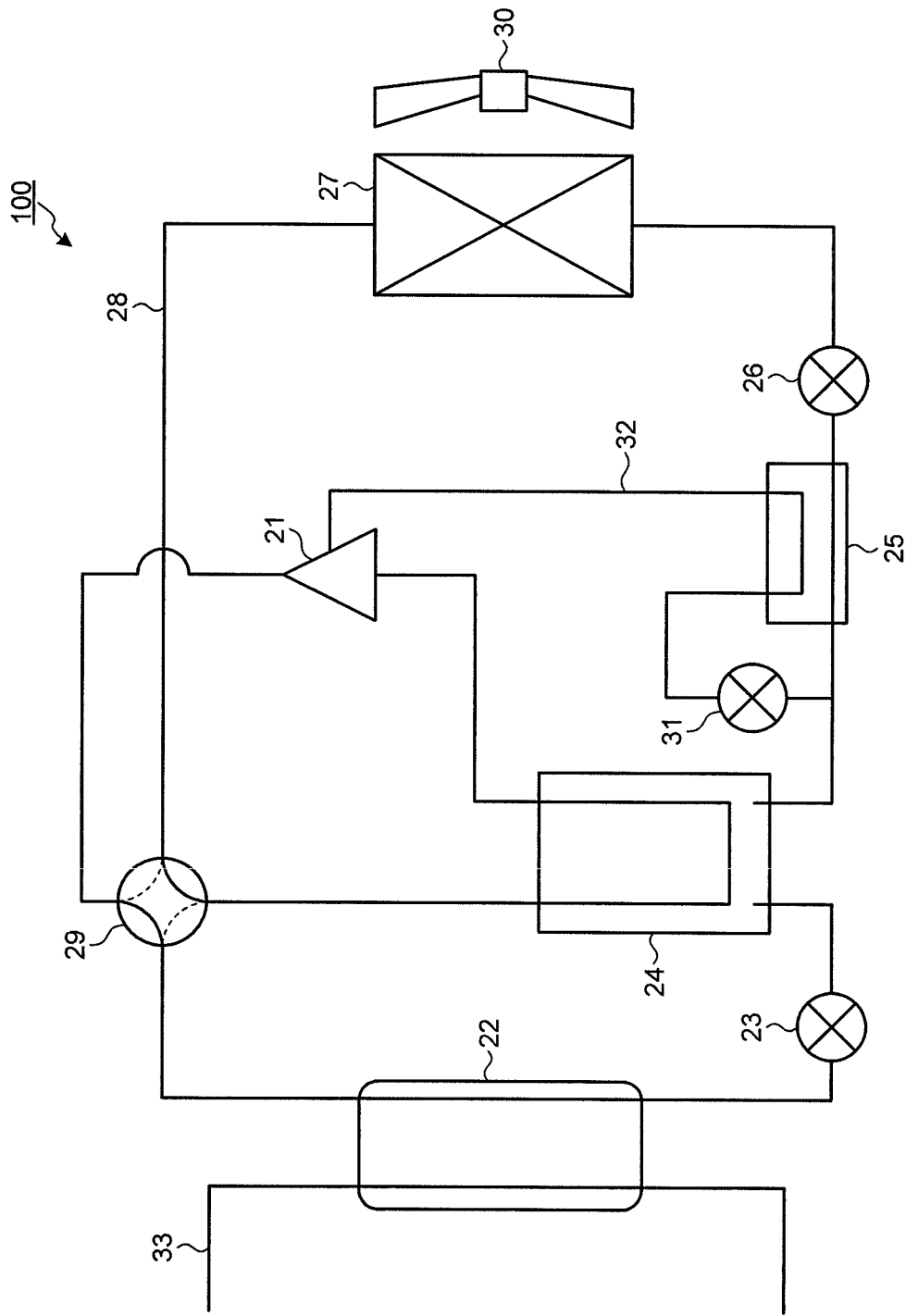
FIG. 11 is a circuit configuration diagram of the heat pump device 100 according to the first embodiment.

FIG. 11 is a circuit configuration diagram of the heat pump device 100 according to the first embodiment.

Figure 12:
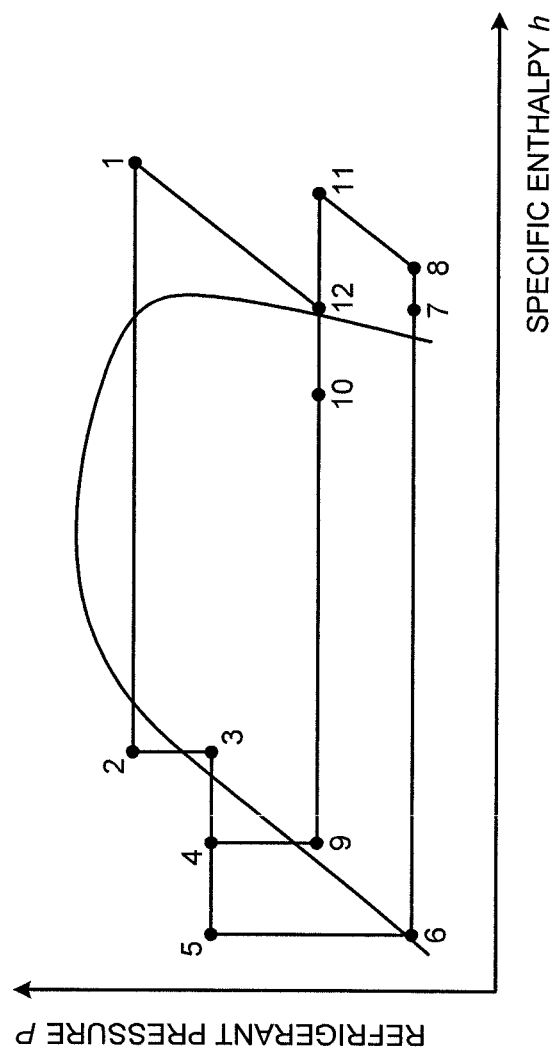
FIG. 12 is a Mollier chart of a state of a refrigerant of the heat pump device 100 shown in FIG. 11.

FIG. 12 is a Mollier diagram of a state of the refrigerant of the heat pump device 100 shown in FIG. 11. In FIG. 12, a specific enthalpy is indicated on a horizontal axis, and a refrigerant pressure is indicated on a vertical axis.

In the heat pump device 100, a compressor 41, a heat exchanger 42, an expansion mechanism 43, a receiver 44, an internal heat exchanger 45, an expansion mechanism 46, and a heat exchanger 47 are sequentially connected by piping, and the heat pump device 100 includes a main refrigerant circuit 48 through which the refrigerant circulates. In the main refrigerant circuit 48, a four-way valve 49 is provided on a discharge side of the compressor 41, so that a circulation direction of the refrigerant can be switched. A fan 50 is provided near the heat exchanger 47. The compressor 41 is the compressor 1 explained in the embodiment described above, and includes the motor 8 driven by the inverter 9 and the compression mechanism 7.

Furthermore, the heat pump device 100 includes an injection circuit 52 that connects from between the receiver 44 and the internal heat exchanger 45 to an injection pipe of the compressor 41 by the piping. An expansion mechanism 51 and the internal heat exchanger 45 are sequentially connected to the injection circuit 52.

A water circuit 53 in which water is circulated is connected to the heat exchanger 42. A device that uses water from a hot water dispenser, a radiator, a radiator for floor heating, or the like is connected to the water circuit 53.

An operation of the heat pump device 100 at the time of a heating operation is explained first. At the time of the heating operation, the four-way valve 49 is set in a direction of a solid line. The heating operation includes not only heating used for air conditioning but also hot-water supply for applying heat to water to make hot water.

A gas-phase refrigerant (at a point 1 in FIG. 12), which has become a refrigerant having a high temperature and a high pressure in the compressor 41, is discharged from the compressor 41, and heat exchanged by the heat exchanger 42, which is a condenser and a radiator, to be liquefied (at a point 2 in FIG. 12). At this time, water circulating in the water circuit 53 is heated by heat radiated from the refrigerant, and used for heating and hot-water supply.

The liquid-phase refrigerant liquefied by the heat exchanger 42 is pressure-reduced by the expansion mechanism 43, and becomes a gas-liquid two-phase state (at a point 3 in FIG. 12). The refrigerant, which has become the gas-liquid two-phase state in the expansion mechanism 43, is heat exchanged with the refrigerant sucked into the compressor 41 by the receiver 44, and is cooled and liquefied (at a point 4 in FIG. 12). The liquid-phase refrigerant liquefied by the receiver 44 is branched to the main refrigerant circuit 48 and the injection circuit 52 to flow therein.

The liquid-phase refrigerant flowing in the main refrigerant circuit 48 is heat exchanged with the refrigerant flowing in the injection circuit 52, which is pressure-reduced by the expansion mechanism 51 and has become the gas-liquid two-phase state, by the internal heat exchanger 45 and is further cooled (at a point 5 in FIG. 12). The liquid-phase refrigerant cooled by the internal heat exchanger 45 is pressure-reduced by the expansion mechanism 46 and becomes the gas-liquid two-phase state (at a point 6 in FIG. 12). The refrigerant, which has become the gas-liquid two-phase state in the expansion mechanism 46, is heat exchanged with ambient air by the heat exchanger 47, which is an evaporator, and is heated (at a point 7 in FIG. 12). The refrigerant heated by the heat exchanger 47 is further heated by the receiver 44 (at a point 8 in FIG. 12), and is sucked into the compressor 41.

On the other hand, as described above, the refrigerant flowing in the injection circuit 52 is pressure-reduced by the expansion mechanism 51 (at a point 9 in FIG. 12), and heat exchanged by the internal heat exchanger 45 (at a point 10 in FIG. 12). A refrigerant (injection refrigerant) in the gas-liquid two-phase state, which has been subjected to thermal exchange by the internal heat exchanger 45, flows into inside of the compressor 41 from the injection pipe of the compressor 41 keeping in the gas-liquid two-phase state.

In the compressor 41, the refrigerant sucked in from the main refrigerant circuit 48 (at the point 8 in FIG. 12) is compressed up to an intermediate pressure and heated (at a point 11 in FIG. 12). The injection refrigerant (at the point 10 in FIG. 12) joins the refrigerant compressed to the intermediate pressure and heated (at the point 11 in FIG. 12), thereby decreasing the temperature (at a point 12 in FIG. 12). The refrigerant having the decreased temperature (at the point 12 in FIG. 12) is further compressed and heated to have a high temperature and a high pressure, and is discharged (at the point 1 in FIG. 12).

When the injection operation is not performed, an aperture of the expansion mechanism 51 is fully closed. That is, when the injection operation is performed, the aperture of the expansion mechanism 51 is larger than a predetermined aperture. However, when the injection operation is not performed, the aperture of the expansion mechanism 51 is set to be smaller than the predetermined aperture. Accordingly, the refrigerant does not flow into the injection pipe of the compressor 41.

The aperture of the expansion mechanism 51 here is controlled by electronic control by a control unit such as a microcomputer.

The operation of the heat pump device 100 at the time of a cooling operation is explained next. At the time of the cooling operation, the four-way valve 49 is set in a direction of a broken line. The cooling operation includes not only cooling used for air conditioning, but also drawing heat from water to make cold water, refrigeration, and the like.

The gas-phase refrigerant, which has become a refrigerant having a high temperature and a high pressure in the compressor 41 (at the point 1 in FIG. 12), is discharged from the compressor 41, and is heat exchanged by the heat exchanger 47, which functions as the condenser and the radiator, to be liquefied (at the point 2 in FIG. 12). The liquid-phase refrigerant liquefied by the heat exchanger 47 is pressure-reduced by the expansion mechanism 46, and becomes a gas-liquid two-phase state (at the point 3 in FIG. 12). The refrigerant, which has become the gas-liquid two-phase state in the expansion mechanism 46, is heat exchanged by the internal heat exchanger 45, and is cooled and liquefied (at the point 4 in FIG. 12). In the internal heat exchanger 45, the refrigerant, which has become the gas-liquid two-phase state in the expansion mechanism 46, is heat exchanged with the refrigerant (the point 9 in FIG. 12), which has become the gas-liquid two-phase state by pressure-reducing the liquid-phase refrigerant liquefied by the internal heat exchanger 45, by the expansion mechanism 46. The liquid-phase refrigerant (the point 4 in FIG. 12) heat exchanged by the internal heat exchanger 45 is branched to the main refrigerant circuit 48 and the injection circuit 52 to flow therein.

The liquid-phase refrigerant flowing in the main refrigerant circuit 48 is then heat exchanged with the refrigerant sucked into the compressor 41 by the receiver 44, and is further cooled (at the point 5 in FIG. 12). The liquid-phase refrigerant cooled by the receiver 44 is pressure-reduced by the expansion mechanism 43 and becomes the gas-liquid two-phase state (at the point 6 in FIG. 12). The refrigerant, which has become the gas-liquid two-phase state in the expansion mechanism 43, is heat exchanged by the heat exchanger 42, which functions as the evaporator, and is heated (at the point 7 in FIG. 12). At this time, because the refrigerant absorbs heat, water circulating in the water circuit 53 is cooled and used for cooling and refrigeration.

The refrigerant heated by the heat exchanger 42 is further heated by the receiver 44 (at the point 8 in FIG. 12), and is sucked into the compressor 41.

On the other hand, the refrigerant flowing in the injection circuit 52 is pressure-reduced by the expansion mechanism 51 (at the point 9 in FIG. 12) as described above, and heat exchanged by the internal heat exchanger 45 (at the point 10 in FIG. 12). A refrigerant (injection refrigerant) in the gas-liquid two-phase state, which has been heat exchanged by the internal heat exchanger 45, flows in from the injection pipe of the compressor 41 keeping in the gas-liquid two-phase state.

The compression operation in the compressor 41 is the same as that of the heating operation.

When the injection operation is not performed, as in the heating operation, the aperture of the expansion mechanism 51 is fully closed, so as not to result in the refrigerant flowing into the injection pipe of the compressor 41.

In the above explanations, the heat exchanger 42 has been explained as a heat exchanger like a plate type heat exchanger that performs heat exchange between the refrigerant and water circulating in the water circuit 53. However, the heat exchanger 42 is not limited thereto, and may be other types of heat exchangers that perform heat exchange between a refrigerant and air.

The water circuit 53 may not be a circuit in which water is circulated, but may be a circuit in which another type of fluid is circulated.

As described above, the heat pump device 100 can be used for a heat pump device using an inverter compressor, such as an air conditioner, a heat pump water heater, a refrigerator, a freezer, and the like.

The invention claimed is:

1. A heat pump device comprising:
   a compressor having a compression mechanism for compressing a refrigerant;
   a motor that actuates the compression mechanism of the compressor;
   a three-phase inverter that is configured to parallel-connect three serial connection parts each being constructed of two switching elements on a positive voltage side and a negative voltage side; and an inverter control unit that generates six drive signals corresponding to the respective switching elements of the three-phase inverter, and outputs the generated drive signals to the corresponding switching elements of the three-phase inverter to cause the three-phase inverter to generate a high-frequency AC voltage, wherein when the drive signals are generated, the inverter control unit switches on/off states of switching elements constituting one of the serial connection parts from a first state of a first zero vector in which all of the switching elements on any one of the positive voltage side and the negative voltage side of the three serial connection parts are turned on and all of switching elements on the other of the positive voltage side and the negative voltage side are turned off, to shift to a state of a real vector other than the first zero vector, and, from the real vector, simultaneously switches on/off states of switching elements constituting two of the serial connection parts, to shift to a state of a second zero vector different from the first state.

2. The heat pump device according to claim 1, wherein the inverter control unit includes:
a voltage-command selection unit that sequentially switches each of three voltage command values Vu*, Vv* and Vw* respectively between two preset values and selects one of the values, in synchronization with a reference signal having a predetermined frequency; and
a drive-signal generation unit that generates six drive signals corresponding to the respective switching elements of the three-phase inverter, by comparing the three voltage command values selected by the voltage-command selection unit with the reference signal.

3. The heat pump device according to claim 2, wherein
the reference signal is a signal whose top and valley in change of a value with respect to time can be identified, and
the voltage-command selection unit switches each of the three voltage command values Vu*, Vv* and Vw* at timings of a top and a bottom of the reference signal.

4. The heat pump device according to claim 1, wherein the inverter control unit operates either in a compression operation mode in which a refrigerant is compressed by the compressor or in a heating operation mode in which the compressor is heated, and when the inverter control unit operates in the compression operation mode, the inverter control unit causes the three-phase inverter to generate an AC voltage having a frequency at which the motor rotates, and when the inverter control unit operates in the heating operation mode, the inverter control unit causes the three-phase inverter to generate the high-frequency AC voltage having a frequency higher than the AC voltage generated in the compression operation mode, at which the motor does not rotate.

5. The heat pump device according to claim 4, wherein the heat pump device further comprises a power supply unit that applies a voltage to the three-phase inverter, and when the inverter control unit operates in the heating operation mode, the power supply unit applies a voltage lower than in a case where the inverter control unit operates in the compression operation mode to the three-phase inverter.

6. The heat pump device according to claim 5, wherein the power supply unit includes:
a three-phase four-wire system AC power supply;
a first rectifier that receives three-phase AC outputs of the AC power supply as inputs and rectifies its voltage;
a second rectifier that receives an output of any one phase of the AC power supply and an output of a neutral point thereof as inputs and rectifies its voltage; and
a switching unit that performs switching so as to apply the voltage rectified by the first rectifier to the three-phase inverter when the inverter control unit operates in the compression operation mode, and apply the voltage rectified by the second rectifier to the three-phase inverter when the inverter control unit operates in the heating operation mode.

7. The heat pump device according to claim 1, wherein a switching element that constitutes the three-phase inverter is made from a wide bandgap semiconductor.

8. The heat pump device according to claim 7, wherein the wide bandgap semiconductor is made from SiC, GaN, or diamond.

9. The heat pump device according to claim 1, wherein the switching element that constitutes the three-phase inverter is a MOSFET having a super junction structure.

10. The heat pump device according to claim 1, wherein
the three-phase inverter is electrically connected to the motor to drive the motor with the high-frequency AC voltage,
the high-frequency AC voltage includes three phases, and
each of the three serial connection parts in the three-phase inverter is configured to generate one phase of the high-frequency AC voltage applied to drive the motor.

11. A heat pump system comprising: a heat pump device including a refrigerant circuit in which a compressor having a compression mechanism for compressing a refrigerant, a first heat exchanger, an expansion mechanism, and a second heat exchanger are sequentially connected by piping; and a fluid utilization device that utilizes fluid heat-exchanged with a refrigerant by the first heat exchanger connected to the refrigerant circuit,
wherein the heat pump device further includes:
a motor that actuates the compression mechanism of the compressor;
a three-phase inverter that is configured to parallel-connect three serial connection parts each being constructed of two switching elements on a positive voltage side and a negative voltage side; and
an inverter control unit that generates six drive signals corresponding to the respective switching elements of the three-phase inverter, and outputs the generated drive signals to the corresponding switching elements of the three-phase inverter to cause the three-phase inverter to generate a high-frequency AC voltage,
wherein when the drive signals are generated, the inverter control unit switches on/off states of switching elements constituting one of the serial connection parts from a first state of a first zero vector in which all of the switching elements on any one of the positive voltage side and the negative voltage side of the three serial connection parts are turned on and all of switching elements on the other of the positive voltage side and the negative voltage side are turned off, to shift to a state of a real vector other than the first zero vector, and, from the real vector, simultaneously switches on/off states of switching elements constituting two of the serial connection parts, to shift to a state of a second zero vector different from the first state.

12. The heat pump device according to claim 11, wherein
the three-phase inverter is electrically connected to the motor to drive the motor with the high-frequency AC voltage,
the high-frequency AC voltage includes three phases, and
each of the three serial connection parts in the three-phase inverter is configured to generate one phase of the high-frequency AC voltage applied to drive the motor.

13. A method for controlling a three-phase inverter in a heat pump device including:
- a compressor having a compression mechanism for compressing a refrigerant;
- a motor that actuates the compression mechanism of the compressor;
- a three-phase inverter that is configured to parallel-connect three serial connection parts each being constructed of two switching elements on a positive voltage side and a negative voltage side; and
- an inverter control unit generating six drive signals corresponding to the respective switching elements of the three-phase inverter, and outputting the generated drive signals to the corresponding switching elements of the three-phase inverter to cause the three-phase inverter to generate a high-frequency AC voltage, wherein the method includes:
- a step of switching on/off states of switching elements constituting one of the serial connection parts from a first state of a first zero vector in which all of the switching elements on any one of the positive voltage side and the negative voltage side of the three serial connection parts are turned on and all of switching elements on the other of the positive voltage side and the negative voltage side are turned off, to shift to a state of a real vector other than the first zero vector; and
- a step of, from the real vector, simultaneously switching on/off states of switching elements constituting two of the serial connection parts, to shift to a state of a second zero vector different from the first state.

14. The method of claim 13, wherein
the three-phase inverter is electrically connected to the motor to drive the motor with the high-frequency AC voltage,
the high-frequency AC voltage includes three phases, and
each of the three serial connection parts in the three-phase inverter is configured to generate one phase of the high-frequency AC voltage applied to drive the motor.

* * * * *